United States Patent
Beaver et al.

(10) Patent No.: US 11,048,854 B2
(45) Date of Patent: Jun. 29, 2021

(54) SYSTEM AND METHOD OF HIGHLIGHTING INFLUENTIAL SAMPLES IN SEQUENTIAL ANALYSIS

(71) Applicant: Verint Americas Inc., Alpharetta, GA (US)

(72) Inventors: Ian Roy Beaver, Spokane, WA (US); Cynthia Freeman, Albuquerque, NM (US); Jonathan Patrick Merriman, Spokane, WA (US); Abhinav Aggarwal, Albuquerque, NM (US)

(73) Assignee: VERINT AMERICAS INC., Alpharetta, GA (US)

( * ) Notice: Subject to any disclaimer, the term of this patent is extended or adjusted under 35 U.S.C. 154(b) by 128 days.

(21) Appl. No.: 16/283,135

(22) Filed: Feb. 22, 2019

(65) Prior Publication Data
US 2019/0258700 A1    Aug. 22, 2019

Related U.S. Application Data

(60) Provisional application No. 62/633,827, filed on Feb. 22, 2018.

(51) Int. Cl.
*G06F 17/00* (2019.01)
*G06F 40/117* (2020.01)
*G06F 40/35* (2020.01)

(52) U.S. Cl.
CPC ............ *G06F 40/117* (2020.01); *G06F 40/35* (2020.01)

(58) Field of Classification Search
CPC .............................. G06F 40/117; G06F 40/35
See application file for complete search history.

(56) References Cited

U.S. PATENT DOCUMENTS

| | | |
|---|---|---|
| 2017/0180276 A1 | 6/2017 | Gershony et al. |
| 2017/0270409 A1 | 9/2017 | Trischler et al. |
| 2017/0286860 A1 | 10/2017 | Chen et al. |
| 2017/0316775 A1* | 11/2017 | Le .......................... G10L 15/16 |
| 2018/0014130 A1 | 1/2018 | Lunner et al. |
| 2018/0025743 A1 | 1/2018 | Childress et al. |
| 2019/0132451 A1* | 5/2019 | Kannan ............... H04M 3/5166 |

OTHER PUBLICATIONS

International Search Report and Written Opinion, dated May 7, 2019, received in connection with International Patent Application No. PCT/US2019/019224.

(Continued)

*Primary Examiner* — Andrew T McIntosh
(74) *Attorney, Agent, or Firm* — Meunier Carlin & Curfman LLC (57) ABSTRACT

Attention weights in a hierarchical attention network indicate the relative importance of portions of a conversation between an individual at one terminal and a computer or a human agent at another terminal. Weighting the portions of the conversation after converting the conversation to a standard text format allows for a computer to graphically highlight, by color, font, or other indicator visible on a graphical user interface, which portions of a conversation led to an escalation of the interaction from an intelligent virtual assistant to a human customer service agent.

14 Claims, 6 Drawing Sheets
(1 of 6 Drawing Sheet(s) Filed in Color)

(56) References Cited

OTHER PUBLICATIONS

Abadi, et al., "TensorFlow: Large-Scale Machine Learning on Heterogeneous Distributed Systems," 2015, 19 pages.

Arras, L., et al., "Explaining Recurrent Neural Network Predictions in Sentiment Analysis," In Proceedings of the 8th Workshop on Computational Approaches to Subjectivity, Sentiment and Social Media Analysis, ACL, 2017, pp. 159-168.

Arras, L., et al., "What is Relevant in a Text Document?": An Interpretable Machine Learning Approach, PloS one vol. 12, No. 8, 2017, 30 pages.

Bach, S., et al., "On Pixel-Wise Explanations for Non-Linear Classifier Decisions by Layer-Wise Relevance Propagation," PloS one, vol. 10, No. 7, 2015, 46 pages.

Bandanau, et al., "Neural Machine Translation by Jointly Learning to Align and Translate," arXiv:1409:0473, 2014, 15 pages.

Brown, P., et al., "An Estimate of an Upper Bound for the Entropy of English," Computational Linguistics, vol. 18, No. 1, 1992, pp. 31-40.

Freeman, C., et al., "Online Proactive Escalation in Multi-Modal Automated Assistants," Proceedings of the Thirtieth International Florida Artificial Intelligence Research Society Conference (FLAIRS), 2017, 6 pages.

Montavon, G., et al. "Methods for Interpreting and Understanding Deep Neural Networks," Digital Signal Processing, 2017, 14 pages.

Pennington, J., et al., "GloVe: Global Vectors for Word Representation," Empirical Methods in Natural Language Processing (EMNLP), https://nlp.stanford.edu/projects/glove, 2014, pp. 1532-1543.

Ribeiro, M., et al., "Why Should I Trust You?: Explaining the Predictions of any Classifier," In Proceedings of the 22nd ACM SIGKDD International Conference on Knowledge Discovery and Data Mining, 2016, pp. 1135-1144.

Shrikumar, A., et al., "Not Just a Black Box: Learning Important Features Through Propagating Activation Differences," 2016, 6 pages.

Yang, Z., et al., "Hierarchical Attention Networks for Document Classification," Carnegie Mellon University, Microsoft Research, Proceedings of NAACL-HLT, 2016, pp. 1480-1489.

\* cited by examiner

PRIOR ART

| TURN | USER TEXT | HAN WEIGHT |
|---|---|---|
| 1 | Hi. I need help. | |
| 2 | Is somebody there? | ■■■■■■■ |
| | ADD TURN 3 ↓ | |

| TURN | USER TEXT | HAN WEIGHT |
|---|---|---|
| 1 | Hi. I need help | |
| 2 | Is somebody there? | |
| 3 | Please help me | |

FIG. 8

| TURN | USER TEXT | OUR WEIGHT |
|---|---|---|
| 1 | Where do you check to see about a refund that AIRLINE is giving us for a portion of our travel we did not get? | |
| 2 | Check refund status | |
| 3 | Refund processing times | |
| 4 | Check refund status | ■■■■■■■ |
| 5 | Check refund status | ■■■■■■■ |

FIG. 9

SYSTEM AND METHOD OF HIGHLIGHTING INFLUENTIAL SAMPLES IN SEQUENTIAL ANALYSIS

CROSS REFERENCE TO RELATED APPLICATIONS

This application claims priority to and incorporates entirely by reference corresponding U.S. Provisional Patent Application Ser. No. 62/633,827 filed on Feb. 22, 2018.

STATEMENT REGARDING FEDERALLY SPONSORED RESEARCH

None.

FIELD

The objective of this disclosure is to create visual alerts for human customer service representatives receiving calls from customers that have been forwarded from intelligent virtual assistants (IVA's).

BACKGROUND

In (Yang et al., 2016), a hierarchical attention network (HAN) was previously created for document classification. The attention layer is used to visualize words influential in classifying the document to explain the model's prediction. The information below regarding the background on HANs is quoted largely from Zichao Yang, Diyi Yang, Chris Dyer, Xiaodong He, Alexander J. Smola, and Eduard H. Hovy, 2016, *Hierarchical Attention Networks for Document Classification*, in HLT-NAACL. pages 1480-1489, which is incorporated by reference as if set forth fully herein.

Hierarchical Attention Networks

Figure 2:
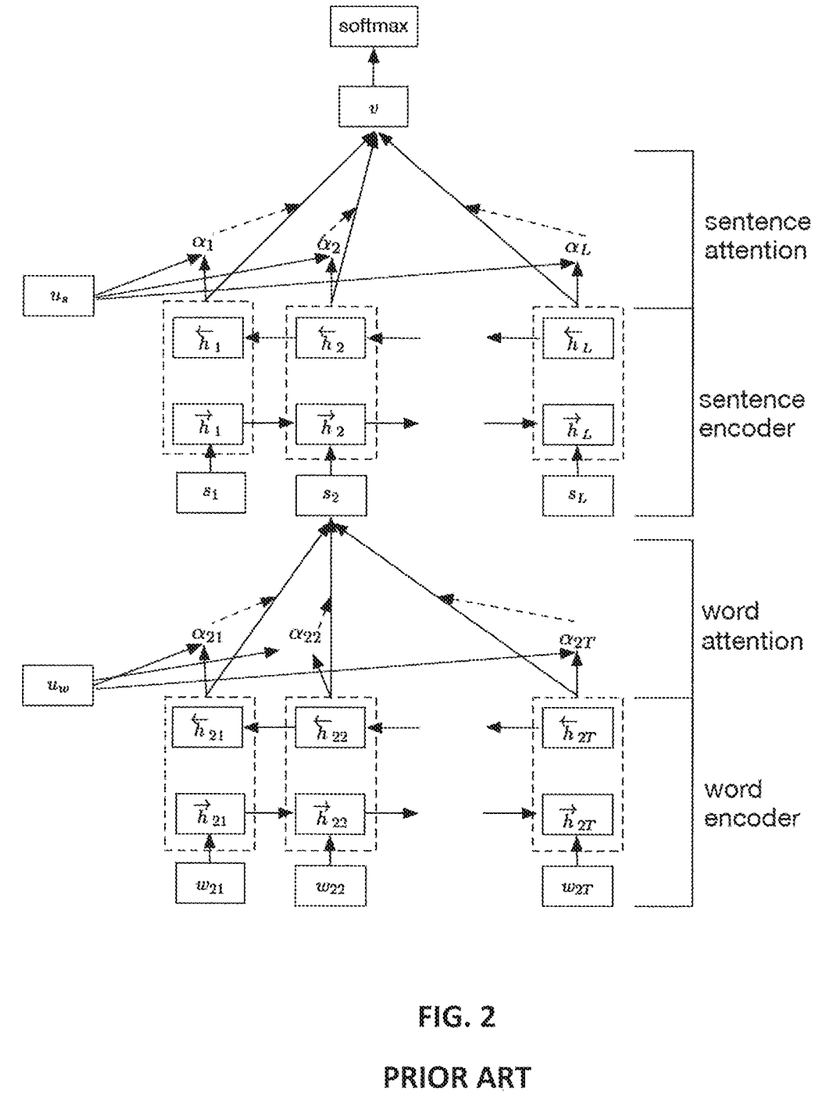
FIG. 2 is a PRIOR ART schematic representation of a hierarchical attention network as illustrated in references noted at the end of this disclosure to Yang et al. 2016.

The overall architecture of the Hierarchical Attention Network (HAN) is shown in Prior Art FIG. 2. It consists of several parts: a word sequence encoder, a word-level attention layer, a sentence encoder and a sentence-level attention layer. This background describes the details of different components in the following sections.

GRU-Based Sequence Encoder

The gated recurrent unit ("GRU") explained by Bahdanau et al. is incorporated by reference as if set forth fully herein and can be found at Dzmitry Bahdanau, Kyunghyun Cho, and Yoshua Bengio. 2014. *Neural machine translation by jointly learning to align and translate*. arXiv preprint arXiv: 1409-0473. It uses a gating mechanism to track the state of sequences without using separate memory cells. There are two types of gates: the reset gate rt and the update gate zt. They together control how information is updated to the state. At time t, the GRU computes the new state as $$h_t = (1-z_t) \odot h_{t-1} + z_t \odot \tilde{h}_t \quad (1)$$

This is a linear interpolation between the previous state h(t−1) and the current new state t computed with new sequence information. The gate zt decides how much past information is kept and how much new information is added, zt is updated as:

$$z_t = \sigma(W_z x_t + U_z h_{t-1} + b_z). \quad (2)$$

where xt is the sequence vector at time t. The candidate state t is computed in a way similar to a traditional recurrent neural network (RNN):

$$\tilde{h}_t = \tanh(W_h x_t + r_t \odot (U_h h_{t-1}) + b_h). \quad (3)$$

Here rt is the reset gate which controls how much the past state contributes to the candidate state. If rt is zero, then it forgets the previous state. The reset gate is updated as follows:

$$r_t = \sigma(W_r x_t + U_r h_{t-1} + b_r) \quad (4)$$

Hierarchical Attention

This background regarding hierarchical attention networks focuses on document-level classification in this work. Assume that a document has L sentences si and each sentence contains Ti words, and "$w_{it}$" with $t \in [1, T]$ represents the words in the $i^{th}$ sentence. The HAN model projects the raw document into a vector representation, on which one can build a classifier to perform document classification. In the following, this background of HAN analysis will present how to build the document level vector progressively from word vectors by using the hierarchical structure.

Word Encoder

Given a sentence with words $w_{it}$, $t \in [0, T]$, the described embodiments first embed the words to vectors through an embedding matrix We, $x_{ij} = w_e w_{ij}$. This background explains a bidirectional GRU (Bahdanau et al., 2014) to get annotations of words by summarizing information from both directions for words, and therefore incorporate the contextual information in the annotation. The bidirectional GRU contains the forward GRU f→which reads the sentence si from $w_{i1}$ to $w_{iT}$ and a backward GRU f←which reads from $w_{iT}$ to $w_{i1}$:

$$x_{it} = W_e w_{it}, t \in [1, T],$$

$$\overrightarrow{h}_{it} = \overrightarrow{GRU}(x_{it}), t \in [1, T],$$

$$\overleftarrow{h}_{it} = \overleftarrow{GRU}(x_{it}), t \in [T, 1].$$

Next, the model obtains an annotation for a given word $w_{it}$ by concatenating the forward hidden state h→it and backward hidden state h←it, i.e., $h_{it} = [h \rightarrow it, h \leftarrow it]$, which summarizes the information of the whole sentence centered around "$w_{it}$."

Note this directly uses word embeddings.

Word Attention

Not all words contribute equally to the representation of the sentence meaning. Hence, this summary introduces an attention mechanism to extract such words that are important to the meaning of the sentence and aggregate the representation of those informative words to form a sentence vector. Specifically, $$u_{it} = \tanh(W_w h_{it} + b_w)$$

$$\alpha_{it} = \frac{\exp(u_{it}^T u_w)}{\sum_t \exp(u_{it}^T u_w)}$$

$$s_i = \sum_t \alpha_{it} h_{it}.$$

That is, one first feeds the word annotation $h_{it}$ through a one-layer MLP to get $u_{it}$ as a hidden representation of $h_{it}$, then the described embodiments measure the importance of the word as the similarity of $u_{it}$ with a word level context vector $u_w$ and get a normalized importance weight αit through a "softmax" function of the prior art to normalize the vector into probability distributions. After that, the described embodiments compute the sentence vector $s_i$ as a weighted sum of the word annotations based on the weights. The context vector $u_w$ can be seen as a high-level representation of a fixed query "what is the informative word" over the words like that used in memory networks. The word context vector $u_w$ is randomly initialized and jointly learned during the training process.

Sentence Encoder Given the sentence vectors $s_i$, the described embodiments can get a document vector in a similar way. the described embodiments use a bidirectional GRU to encode the sentences:

$$\vec{h}_i = \overrightarrow{GRU}(s_i), i \in [1,L],$$

$$\overleftarrow{h}_i = \overleftarrow{GRU}(s_i), t \in [L,1].$$

This background HAN concatenates h→i and h←j to get an annotation of sentence i, i.e., hi=[h→i, h←i]. The variable "hi summarizes the neighbor sentences around sentence i but still focus on sentence i.

Sentence Attention

To reward sentences that are clues to correctly classify a document, the described embodiments again use attention mechanism and introduce a sentence level context vector us and use the vector to measure the importance of the sentences. This yields where v is the document vector that summarizes all the information of sentences in a document. Similarly, the sentence level context vector can be randomly initialized and jointly learned during the training process.

$$u_i = \tanh(W_s h_i + b_s), \qquad (8)$$

$$\alpha_i = \frac{\exp(u_i^T u_s)}{\sum_i \exp(u_i^T u_s)}, \qquad (9)$$

$$v = \sum_i \alpha_i h_i, \qquad (10)$$

where v is the document vector that summarizes all the information of sentences in a document. Similarly, the sentence level context vector can be randomly initialized and jointly learned during the training process.

Document Classification

The document vector v is a high level representation of the document and can be used as features for document classification:

$$p = \text{softmax}(W_c v + b_c).$$

One uses the negative log likelihood of the correct labels as training loss:

$$L = -\sum_d \log p_{dj},$$

where j is the label of document d.

LSTM Background

Unlike the above described gated recurrent units (GRUs), long short term memory cells (LSTMs) described below make small modifications to the information by multiplications and additions. This structure is well explained at Pranjal Srivastava https://www.analyticsvidhya.com/blog/2017/12/fundamentals-of-deep-learning-introduction-to-lstm, December 2017, which is incorporated by reference as if set forth fully herein.

With LSTMs, the information flows through a mechanism known as cell states. This way, LSTMs can selectively remember or forget things. The information at a particular cell state has three dependencies.

These dependencies can be generalized to any problem as:

The previous cell state (i.e. the information that was present in the memory after the previous time step);

The previous hidden state (i.e. this is the same as the output of the previous cell);

The input at the current time step (i.e. the new information that is being fed in at that moment).

A typical LSTM network is comprised of different memory blocks called cells. There are two states that are being transferred to the next cell; the cell state and the hidden state. The memory blocks are responsible for remembering things and manipulations to this memory is done through three major mechanisms, called gates. Each of them is being discussed below.

Forget Gate

A forget gate is responsible for removing information from the cell state. The information that is no longer required for the LSTM to understand things or the information that is of less importance is removed via multiplication of a filter.

Input Gate

The input gate is responsible for the addition of information to the cell state.

Output Gate

This job of selecting useful information from the current cell state and showing it out as an output is done via the output gate.

The above noted gates allow LSTMs to analyze changes in a conversation as the conversation progresses, and then going back and weighting earlier portions of the conversation states with a correction factor determined by later states.

Even though prior research has presented instances of highlighting certain entered data in a visual form by calculating the data's importance to the context, a need still exists in the art of neural networks for automated virtual assistants to address an issue that the standard HAN procedure omits—creating more information in real time visual displays of text, color and graphics when the HAN procedures of the prior art yield uniform weights to all portions of a data set.

SUMMARY

A computerized method for highlighting relative importance of portions of a conversation displayed on a graphical user interface includes storing the conversation in computerized memory connected to a computer processor that is configured to display conversations on a graphical user interface, wherein a display of the conversation illustrates conversation data according to respective conversation participants' turns in providing conversation input. The method further includes weighting respective turns of the conversation by providing the conversation input of the respective turns to a hierarchical attention network stored in the memory, wherein the hierarchical attention network uses the processor to calculate sequential long-short-term-memory cells (LSTM) in the memory. By using later LSTM cell data to update weighting values for prior LSTM cell data in a sequence of turns of conversation input data, the method includes displaying the conversation participants' turns on the graphical user interface with a visible indication of respective weighting values for each of the participants' turns.

A computerized method according to this disclosure includes non-limiting embodiments wherein weighting the respective turns comprises adding conversation input data from additional later turns of the conversation to new LSTM cells;

A computerized method according to this disclosure includes non-limiting embodiments wherein weighting the respective turns comprises changing weights of the prior LSTM cell data in response to the additional later turns;

A computerized method according to this disclosure includes non-limiting embodiments wherein the processor identifies a plurality of turns in the conversation illustrating at least one change in weight distribution among the plurality of turns as an attention dependency switch;

A computerized method according to this disclosure includes non-limiting embodiments wherein the processor identifies sequential turns in the conversation illustrating at least one change in weight between two turns as a context dependency switch;

A computerized method according to this disclosure includes non-limiting embodiments wherein the processor identifies at least one turn in the conversation illustrating at least one change in weight, across the entire conversation and greater than a variation dependency variable, as a variation dependency switch;

A computerized method according to this disclosure includes non-limiting embodiments wherein weighting a group of turns in the conversation comprises forming a weight vector from occurrences of at least one attention dependency switch, at least one context dependency switch, and at least one variation dependency switch, averaging components of the vector, and representing each term in the group of terms on the graphical user interface with a pixel intensity that corresponds to the average of the components of the weight vector;

A computerized method according to this disclosure includes non-limiting embodiments wherein the hierarchical attention network uses the processor to calculate sequential long-short-term-memory cells (LSTM) in the memory when a prior weighting of turns in a conversation have had a degree of uniformity greater than a uniformity tolerance threshold;

A computerized method according to this disclosure includes non-limiting embodiments wherein the processor and memory form a turn weight vector comprising weighting values for turns in the conversation and calculate a degree of uniformity ($\alpha$) across members of the vector;

A computerized method according to this disclosure includes non-limiting embodiments wherein the processor and the memory use the turn weight vector to identify either uniformity or non-uniformity across the weights in the weight vector by comparing sequential weighting vectors from sequential turns to an attention dependency variable ($\tau a$);

A computerized method according to this disclosure includes non-limiting embodiments wherein the processor and the memory use the turn weight vector to identify instances across the conversation in which an addition of a turn changes the weights of previous turns by comparing the weighting vectors to a context dependency variable ($\tau c$);

A computerized method according to this disclosure includes non-limiting embodiments wherein the processor and the memory use the turn weight vector to identify individual weighting value changes across the conversation in which an addition of a turn changes the weight of a respective individual weighting value more than variation dependency variable ($\tau v$);

A computerized method according to this disclosure includes non-limiting embodiments wherein displaying the conversation participants' turns on the graphical user interface with a visible indication of respective weighting values comprises:

the processor and memory forming a turn weight vector comprising weighting values for turns in the conversation and calculating a degree of uniformity ($\alpha$) across members of the vector;

the processor and the memory using the turn weight vector to identify attention dependency and either uniformity or non-uniformity across the weighting values in the weight vector by comparing sequential weighting vectors from sequential turns to an attention dependency variable ($\tau a$).

the processor and the memory using the turn weight vector to identify instances across the conversation in which an addition of a turn identifies context dependency and changes in the weighting values of previous turns by comparing the weighting vectors to a context dependency variable ($\tau c$);

the processor and the memory use the turn weight vector to identify variation dependency and individual weighting value changes across the conversation, in which an addition of a turn changes the weight of a respective individual weighting value more than variation dependency variable ($\tau v$); and selecting the visible indication for displaying the respective turns according to combinations of attention dependency, context dependency, and variation dependency across the turn weight vector for the conversation;

A computerized method according to this disclosure includes non-limiting embodiments wherein a selection of the visible indication of respective weighting values for each of the participants' turns is updated in real time during the conversation;

A computerized method according to this disclosure includes non-limiting embodiments wherein a point of escalation in the conversation is identified from the weighting values; and A computerized method according to this disclosure includes non-limiting embodiments wherein the conversation comprises at least one of text data, voice data, natural language data derived from voice data, and graphics data.

BRIEF DESCRIPTION OF THE DRAWINGS

The patent or application file contains at least one drawing executed in color. Copies of this patent or patent application publication with the color drawing(s) will be provided by the Office upon request and payment of the necessary fee. Reference will now be made to the accompanying drawings, which are not necessarily drawn to scale.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the embodiments described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this disclosure belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically incorporated by reference in their entireties and at least for the material for which they are cited.

In the discussions below, a "turn" refers to back and forth portions of a dialog in which one of the users of a system is providing content, whether online, typed, voice, data, graphics, or any other communications.

The discussion herein discloses uses for conversation "c" that would include all kinds of conversation data, without limitation, being text data, voice data, graphical data or information that has been created by natural language processing functions.

The term conversation is used in its broadest sense to include the passing of information between two participants, where either or both of the participants may be computerized or human agents. The participants in a conversation take "turns" providing conversation input, and the use of the term "turns" is not limited in any respect related to time, as the turns can be sequential or contemporaneous to any degree or at exactly the same time.

The references to LSTM cell data by the words "later" and "prior" is only for example purposes to note that the cell data is stored in a different portion of memory (i.e., the later and prior data are distinct). The later and prior cell data can be viewed in a temporal context with prior data being entered into a network before later cell data, but that is not limiting of the disclosure. This is particularly true when methods disclosed herein utilize forward and backward processes along any given string of data at issue.

In one scenario, a user and an automated computer system each take turns communicating in an online or electronic communication session. To maintain quality of service, users are transferred to human representatives when their conversations with an intelligent virtual assistant (IVA) fail to progress. These transfers are known as "escalations." This application involves, in one non-limiting embodiment, the escalation of conversations or data entry such as, but not limited to, those recorded as Internet chats, online help sessions, natural language processing of voice data, and the like. This disclosure applies HAN to such conversations in a sequential manner by feeding each user turn in a customer interaction to HAN as they occur, to determine if the conversation should escalate. If so, the user will be transferred to a live chat representative to continue the conversation. To help the human representative quickly determine the cause of the escalation, the described embodiments generate a visualization of the user's turns using the attention weights to highlight the turns influential in the escalation decision. This helps the representative quickly scan the conversation history and determine the best course of action based on problematic turns. Unfortunately, there are instances where the attention weights for every turn at the point of escalation are nearly equal, requiring the representative to carefully read the history to determine the cause of escalation unassisted. Table 1 shows one such example with uniform attention weights at the point of escalation.

This disclosure notes that the visualizations are generated in real-time at the point of escalation. The user must wait for the human representative to review the IVA chat history and resume the failed task. Therefore, the described embodiments seek visualization methods that do not add significant latency to the escalation transfer. Using the attention weights for turn influence is fast as they were already computed at the time of classification. However, these weights will not generate useful visualizations for the representatives when their values are similar across all turns (see HAN Weight in Table 1). To overcome this problem, the described embodiments develop a method that produces more informative visuals (see "OUR" Disclosure Weight in Table 1) using the changes in turn importance over cumulative turns, instead of raw turn weights.

TABLE 1

| TURN | USER TEXT | HAN WEIGHT | OUR WEIGHT |
|------|-----------|------------|------------|
| 1 | Is there a customer service phone number | 0.3 | 0.3 |
| 2 | I just requested a refund through Expedia because I picked the wrong flight day, how long will it take | 0.3 | 0.3 |
| 3 | Is there a way to expedite that | 0.3 | 0.6 |
| 4 | Can we rush the refund because I need to book another ticket | 0.3 | 0.6 |
| 5 | Refunds | 0.3 | 1.0 |

In Table 1, above, the influence on escalation of each user turn in a conversation. Higher weight turns are displayed as being darker in color. As the HAN weights are uniform, and, therefore, similar in color, it is difficult to infer the cause of escalation. In contrast, according to this disclosure, the weights of the visual noted as "OUR Weight" on the same conversation show distinct turn importance, thus, quickly indicating the cause of escalation in this conversation.

To determine when the turn weights are uniform, the described embodiments use perplexity (Brown et al., 1992), the exponential of the entropy. Since entropy is a measure of the degree of randomness, perplexity is then a measure of the number of choices that comprise this randomness. If a conversation c escalates on turn i with attention weights [w1; w2; . . . $w_i$], let $\alpha c = i - perplex(w1; w2; . . . wi)$. Intuitively, $\alpha$ should be low when uniformity is high.

Figure 1:
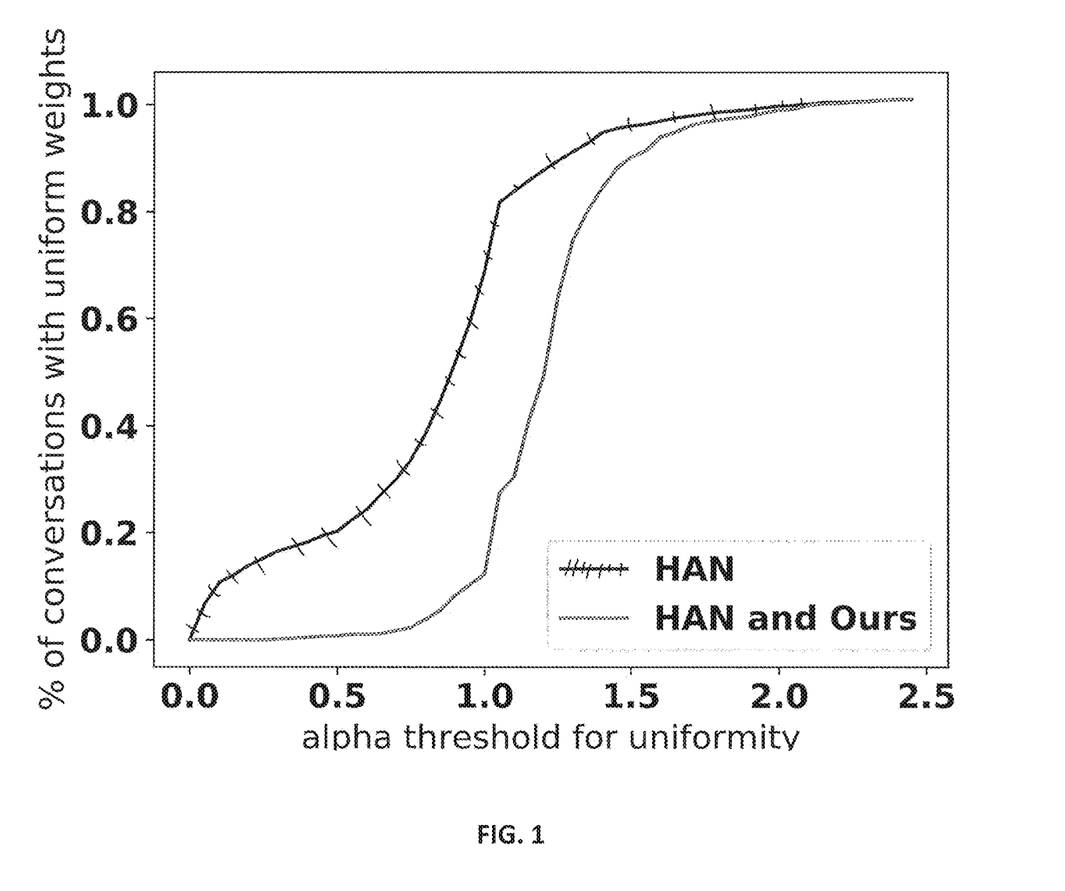
FIG. 1 is a schematic representation of a graph showing a comparison between prior art hierarchical attention network data and hierarchical network data of this disclosure.

This disclosure measures the $\alpha$ of every escalated conversation and defines a uniformity threshold for a (FIG. 1). For example, if the $\alpha$ threshold for uniformity is 0.5, 20% of conversations in the dataset will result in HAN visuals where all turns have similar weight; thus, no meaningful visualization can be produced. Companies that deploy IVA solutions for customer service report escalated conversation volumes of 1,100 per day for one customer (Next IT, 2018). Therefore, even at 20%, contact centers handling multiple companies may see hundreds or thousands of conversations per day with no visualizations. However, if the described embodiments use the embodiments described herein in instances where HAN weights are uniform, the conversations are all non-uniform using the same $\alpha = 0.5$.

Figure 8:
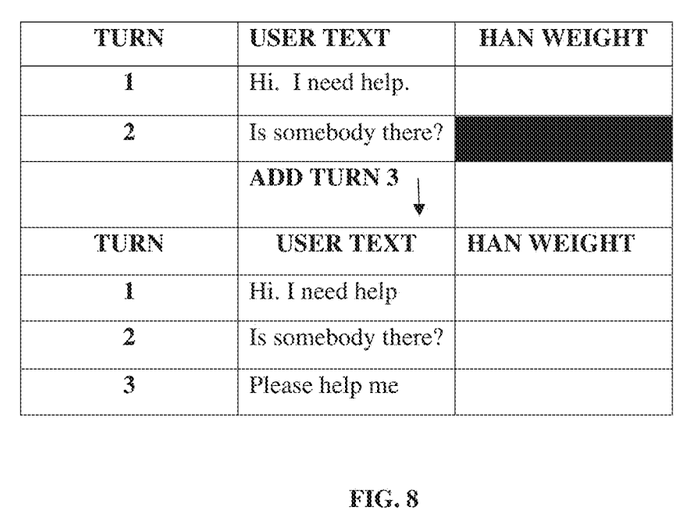
FIG. 8 is a tabular schematic view of a series of conversation turns between a caller and an interactive virtual assistant and uses black and white colored boxes to illustrate how weights of each turn can be uniform or non-uniform depending on the number and content of turns in the conversation.

In FIG. 8, the described embodiments see the bottom visualization where the weights are uniform at the point of escalation. However, on the 2nd turn, the HAN had produced more distinct weights. At the point of escalation on turn 3 in FIG. 8, the weights become uniform. It is clear from this example that the importance of a single turn can change drastically as the conversation progresses. Using these changes in turn attention, the described embodiments formalize a set of rules to create an alternative visualization for the entire conversation in cases where the attention weights are uniform.

Figure 5:
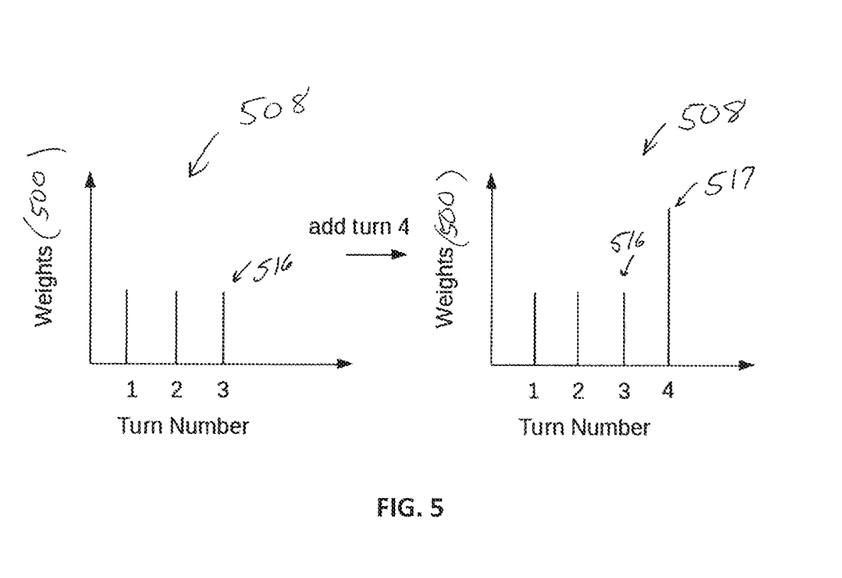
FIG. 5 is a schematic representation of conversation data separated in to turns from each conversation participant and adjusted as additional turns are added to the memory.

For every conversation of length n turns, when turn n+1 is added, the described embodiments consider three forms of behavior that help to create a new visual: attention, context, and variation dependency switches. An attention dependency switch occurs when the addition of a turn changes the distribution of weights. Suppose the described embodiments have a 4-turn conversation. In FIG. 5, considering only the first 3 turns gives a uniform distribution of weights (left). However, when the described embodiments add turn 4 (FIG. 5, right), the distribution shifts to one of non-uniformity. The described embodiments consider the addition of any such turn that causes a switch from uniform to non-uniform or vice-versa in the creation of visuals.

Figure 6:
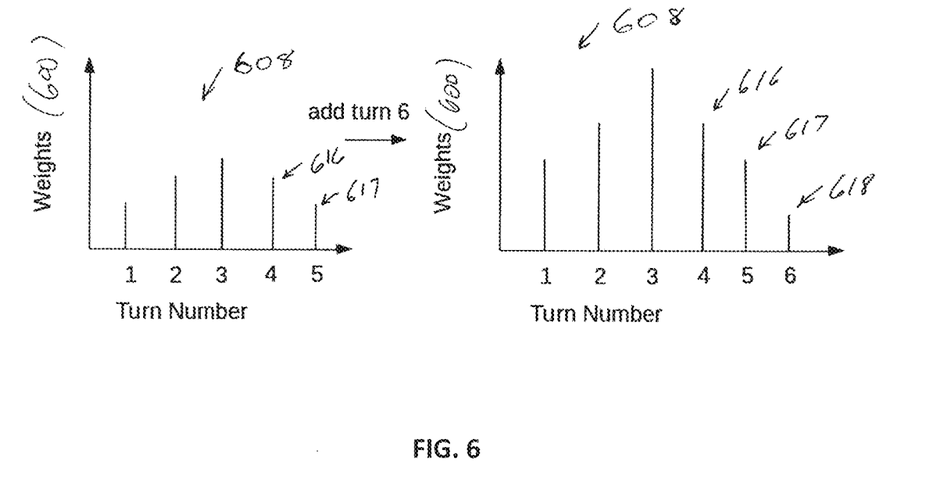
FIG. 6 is a schematic representation of conversation data separated in to turns from each conversation participant and adjusted as additional turns are added to the memory.

A context dependency switch occurs when the addition of a turn causes a previous turn's weight to change significantly. In FIG. 6, the addition of turn 6 causes turn 3's weight to spike.

The final switch of consideration is a variation dependency switch, which occurs when the weight of some turn i changes significantly over the entire course of a conversation. Note that this differs from context dependency because the latter determines turn i's change with the addition of only one turn. For determining attention dependency, the described embodiments consider normalized attention weights, but for variation and context, the described embodiments consider the unnormalized output logits from the HAN. It is also important to note that an attention dependency switch can occur without a context dependency switch and vice-versa.

Escalation data described herein was obtained from (Freeman and Beaver, 2017), which consists of 7754 conversations (20; 808 user turns) from two commercial airline IVAs. 1268 of the 7754 conversations had been tagged for escalation. The classifier (HAN) used for escalation prediction is outlined in (Yang et al., 2016). Given the occurrences of attention ($\mu$), context ($\beta$), and variation ($\gamma$) dependency switches, the described embodiments show a procedure on how a visual of the entire conversation can be created. For each turn Ti, the described embodiments create a vector $vi = [\mu_i; \beta_i; \gamma_i]$, where each variable inside this vector takes the value 1 when the attention, context, and variation dependency switches trigger, respectively, and 0 otherwise. The described embodiments compute mean $vi = (\mu_i + \beta_i + \gamma_i)/3$, and use this value to represent the intensity of a single color (blue in Table 1). The higher the value of mean vi, the higher the color intensity.

After removing one turn conversations (as they are uniform by default), the number of turns that had a context dependency switch as a result of adding a new turn was 4,563. However, the number of times that such an event coincided at least once with escalation was 766. As it appeared that the effect of context dependency was quite low, the described embodiments next considered the variation and attention dependency variables. The total number of turns that had a variation dependency switch was 2,536, and 1,098 also coincided with a change of escalation, indicating that a variation dependency switch is potentially valuable in the creation of new visuals. In addition, the number of uniform to non-uniform turn pairs (uniform weight distribution for first i turns but non-uniform for first i+1 turns) was 1; 589 whereas the number of non-uniform to uniform turn pairs was 259. Out of the times when there was a uniform to non-uniform switch, 710 cases coincided with escalation compared to only 22 for non-uniform to uniform changes.

Figure 9:
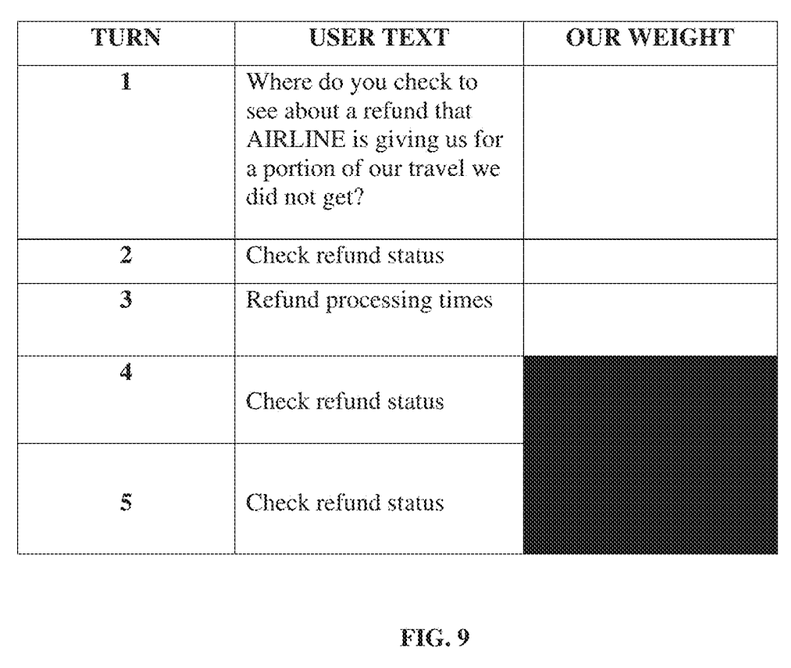
FIG. 9 is a tabular schematic view of a series of conversation turns between a caller and an interactive virtual assistant and uses black and white colored boxes to illustrate how weights of each turn are non-uniform when using embodiments of this disclosure.

As shown in FIG. 1, the addition of the disclosed method when the HAN weights are uniform greatly reduces or even eliminates the uniformity at lower a thresholds. To determine if the visuals were also assigning weights properly, the described embodiments had three reviewers rate on a 0 to 10 scale (0 being poor, 10 being best) of how well each visualization highlights the influential turns for escalation in the conversation (annotator instructions available in supplement). See FIG. 9 for an example that was tagged nearly perfectly by reviewers.

From the 1,268 conversations that escalated in the dataset, the described embodiments first filtered conversations by a uniformity threshold, α. The described embodiments chose an α value of 0:18 empirically as follows. Three reviewers tagged 100 random escalated conversations for uniformity of weights at various α thresholds. As expected, the weights appeared less uniform as α increased. For example, at α=0.5, weights such as [0.2; 0.2; 0.6] would be considered uniform which all three reviewers disagreed with. However, the reviewers all agreed that weight distributions below the 0:18 threshold appeared uniform 90% of the time, which the described embodiments considered good agreement. At this threshold, 10.9% or 138 conversations remained.

Next, the described embodiments filtered the conversations that were not correctly classified by HAN, leaving 85 or 6.7%. The average 0-10 rating between the three reviewers over the remaining conversations was 6. This demonstrates that on average, reviewers felt that the visualizations were adequate. Put in perspective, adding adequate visuals to the thousands of daily escalations that would otherwise have no visual is a great improvement. This may reduce the summarization time for human representatives, and, therefore, user wait time on transfer.

In addition to the possible reduction in human review time, the visuals only required 0.9 milliseconds on average to compute per conversation. This adds insignificant latency to the transfer while generating the visualization, which is an important goal.

Perplexity

For a probability distribution D over the sample space, the perplexity measure is defined as the exponential of the entropy of D. More formally, $perplex(D)=2^{H(D)}$, where the entropy is $$H(D) = \sum_{x \in \Omega} D(x) \log_2 \frac{1}{D(x)}.$$

As entropy is a measure of the degree of randomness in D, perplexity is a measure of the number of choices that comprise this randomness. The following properties of perplexity will be applicable.

1. For any distribution D, the value of perplex(D) is always positive. ($2^x > 0$ for all x.)

2. For any distribution D over N values, the described embodiments have perplex(D)≤N. The larger the value, the closer D is to being uniform. The equality holds if and only if D is uniform.

With respect to property (2) above, the described embodiments define a metric $\alpha_N(D)=N-perplex(D)$, where D is any distribution over N values. Thus, for all N≥1 and all distributions D that are uniform over N values, it must be the case that $\alpha N(D)=0$. Furthermore, $\alpha_N(D) \geq 0$ for all N and D. The described embodiments drop the subscript N from $\alpha_N(D)$ when it is obvious from the context.

Perplexity Based Measure of Uniformity

In this disclosure, obtaining an exact uniform distribution is inefficient. In such cases, it suffices to consider a distribution to be uniform if it is almost the same over all values. In other words, a given distribution D on N values is τ-uniform if $\alpha_N(D) \leq \tau$. Note that since $\alpha_N(D)$ can be at most N−1 (as N≥1), this restricts τ to be any real number between 0 and N−1. In this context, given a distribution D over N values, the described embodiments will refer to α(D) as the measure of uniformity of D. The smaller the value of α(D), the closer D is to being uniform.

Given a conversation C that contains N turns, let $w_i$ be the vector of attention weights obtained from inputting $T_1, \ldots T_i$ (where $T_i$ is the i-th turn in C) to $H_{AN}$.

Attention Dependency Variable Change

There is an attention dependency variable change from turn $T_i$ to $T_{i+1}$ with some threshold τa if any one of the following occurs:

1. $\alpha(w_{i+1}) \geq \tau_a$ and $\alpha(w_i) < \tau_a$
2. $\alpha(w_i) \geq \tau_a$ and $\alpha(w_{i+1}) < \tau_a$ With 1, the described embodiments are switching from a uniform distribution to a non-uniform distribution with the addition of turn $T_{i+1}$. With 2, the described embodiments are switching from a non-uniform distribution to a uniform distribution.

This τa is chosen in such a way to determine approximate uniformity as mentioned in section 2 as it is inefficient for this disclosure.

Note that it is possible that the attention dependency variable change is observed for many turns and not just one.

Context Dependency Variable Change

To capture the event in which the addition of a turn changes the weights of some previous turn significantly, the described embodiments use a context dependency variable. There is a context dependency variable change in turn $T_j$ by addition of turn $T_i$ for j<i with threshold $\tau_c > 0$ if $$|w_{i+1}[j] - w_i[j]| \geq \tau_c.$$

Note that wi[j] denotes the weight of turn Tj in wi.

Variation Dependency Variable Change

Finally, the described embodiments capture how the weight of a given turn changes every time a new turn is appended to the conversation. This differs from context dependency, where the described embodiments consider the effect of adding only one turn. There is a variable dependency variable change in turn Ti with some threshold $\_v > 0$ when the conversation has N turns if $$\frac{1}{N-i} \sum_{k=i}^{N-1} |w_k[i] - w_{k+1}[i]| \geq \tau_c$$

In testing the operations of this disclosure, the described embodiments compute the thresholds mentioned in the definitions above as follows:

1. For attention dependency, the described embodiments experimented with various $\tau_a$ thresholds and tagged 100 randomly chosen conversations for each of those thresholds to determine potential candidates. For example, using a threshold of 0.5, weight vectors such as [0.2; 0.2; 0.6] would be considered uniform, which the described embodiments greatly disagreed with. However, the reviewers all agreed that weight distributions below the 0:18 threshold appeared uniform 90% of the time, which the described embodiments considered good agreement.

2. For context dependency and variation dependency switches, the described embodiments chose the value of $\tau_c$ and $\tau_v$, respectively, using the 75th percentile of the values for different turns. Upon comparison with manual tagging of 100 randomly chosen conversations, the annotators were observed to agree on all 100 cases for the context dependency switch and 99 out of 100 cases for the variation dependency switch.

Figure 3:
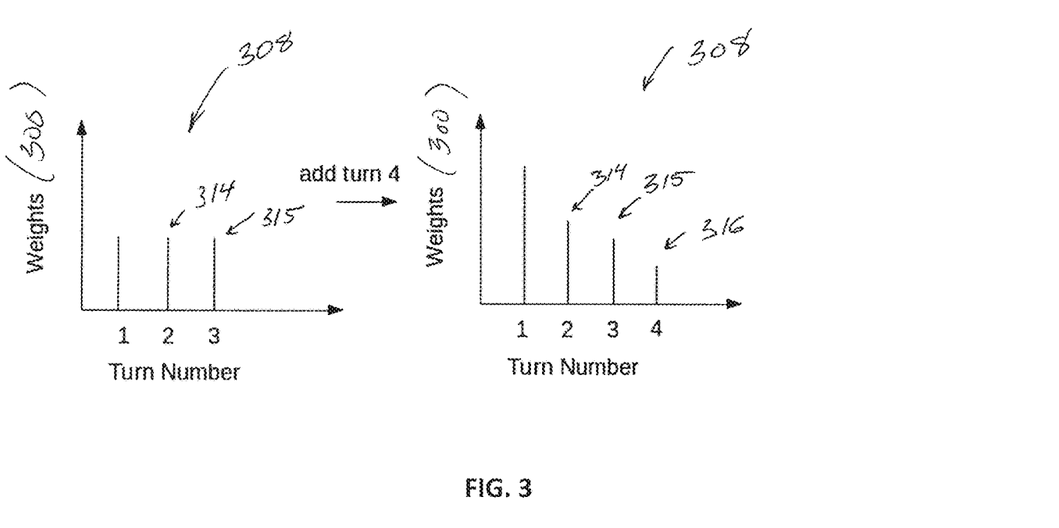
FIG. 3 is a schematic representation of conversation data separated in to turns from each conversation participant and adjusted as additional turns are added to the memory.
Figure 4:
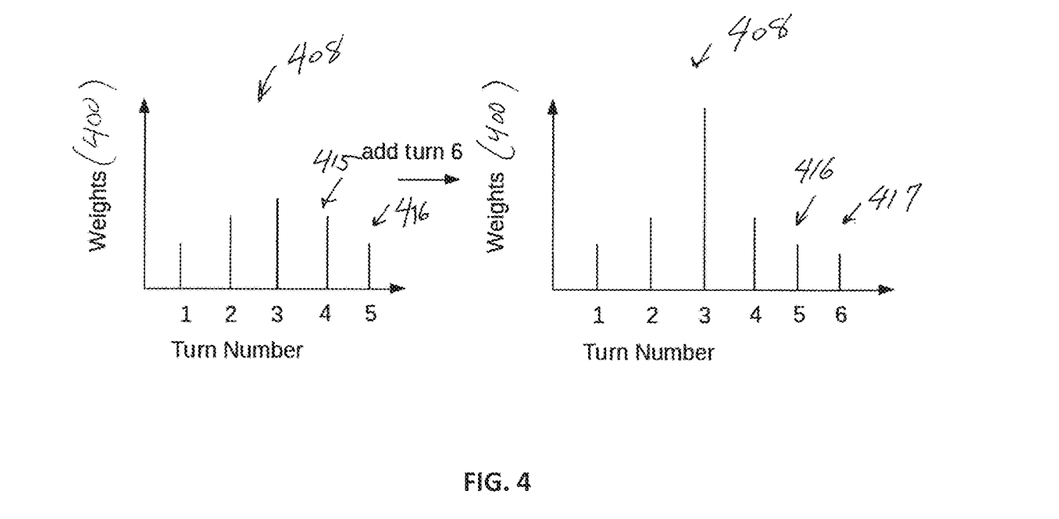
FIG. 4 is a schematic representation of conversation data separated in to turns from each conversation participant and adjusted as additional turns are added to the memory.

In FIG. 3, an attention dependency switch has occurred (uniform to non-uniform distribution), but there is no context dependency variable change. In FIG. 4, a context dependency variable change has occurred as many previous weights have spiked, but the distribution of weights has not changed (no attention dependency variable change).

In one non-limiting embodiment, a hierarchical attention network was implemented with TensorFlow (Abadi et al., 2015) and has substantially the same architecture as in (Yang et al., 2016) with the exception that LSTM cells are used in place of GRU. The described embodiments used the 200-dimensional word embeddings from glove.twitter.27B (Pennington et al., 2014) and did not adapt them during the training of our model.

Each recurrent encoding layer had 50 forward and 50 backward cells, giving 100-dimensional embeddings each for turns and conversations. In predicting escalation, the network obtained an Fi of 81.31+/−0:94% (87:71+/−3:17% precision, 75.90+/−2:61% recall, averaged over five random splits). To compute these metrics, turn-level annotations were converted to conversation-level annotations by labeling a conversation escalate if any turn in the conversation was labeled escalate.

For the visualization experiments, a random 80-20 split was used to create training and testing sets. The training set consisted of 6,203 conversations of which 1,027 should escalate. The testing set consisted of 1; 551 conversations of which 241 should escalate.

Annotator Instructions

The annotators were instructed to rate on a scale of 0 to 10 of how well, in their opinion, each visualization highlights the influential user turns for escalation in a given conversation. They were reminded that if a turn is given a darker color, then that turn supposedly has greater influence in determining escalation. They were, thus, given the task of determining if they agree with the visualization's decision. A rating of 0 was instructed to be given on complete disagreement, and 10 upon perfect agreement. Previously, the described embodiments considered a technique which used a single color with varying intensity to highlight when the different switches are triggered. Recall that for each turn $T_i$, the described embodiments create a vector $v_i=[\mu_i, \beta_i, \gamma_i]$, where each variable inside this vector takes the value 1 when the attention, context, and variation dependency switches trigger, respectively, and 0 otherwise. An alternate approach is to use the vector vi to create an RGB visual (see Table 2), in which the described embodiments obtain as follows. Table 2 is an example of a RGB visual. The turn color denotes what combination of attention weight behaviors were triggered in the turn. The described embodiments compute the RGB value of the color used to denote $T_i$ by setting r=255 when $\mu_i=1$, b=255 if $\beta_i=1$ and g=255 if $\gamma_i=1$.

TABLE 2

| TURN | USER TEXT | RGB Weight |
|---|---|---|
| 1 | How do I change my ticket? | White |
| 2 | bwrlzd | Green |
| 3 | How do I change my ticket? | Black |

TABLE 2-continued

| TURN | USER TEXT | RGB Weight |
|---|---|---|
| 4 | I would like to change my destination airport | Blue |
| 5 | Same day flight changes | Yellow |

If any of $v_i$'s elements are 0, its respective color value is set to 0. Based on these values, the final color denotes what combination of these three values in the vector are represented. Unlike the monochrome visual, this visualization scheme allows the user to look at the colors and deduce the events that $T_i$ must have triggered. However, this visual is more complex for a reader to understand and requires constant access to a color legend (see Table 3) for interpretation.

TABLE 3

| attention | context | variation | color |
|---|---|---|---|
| X | | | Red |
| | X | | Green |
| | | X | Dk Blue |
| X | X | | Yellow |
| X | | X | Pink |
| | X | X | Lt Blue |
| | | | White |
| X | X | X | Black |

Since one non-limiting goal here is to produce user-friendly visuals which can be interpreted quickly, the described embodiments only suggest the RGB visual as an alternative and use the monochrome visual in most applications.

In accordance with the above noted embodiments, a computerized method for highlighting relative importance of portions of a conversation displayed on a graphical user interface includes storing the conversation "c" in computerized memory (204) connected to a computer processor (602) that is configured to display conversations on a graphical user interface (217), wherein a display of the conversation illustrates conversation data according to respective conversation participants' turns (1,2, 3, 4, 5, 6, et seq.) in providing conversation input. The method further includes weighting respective turns of the conversation by providing the conversation input of the respective turns to a hierarchical attention network stored in the memory, wherein the hierarchical attention network uses the processor to calculate sequential long-short-term-memory cells (LSTM) (308, 408, 508, 608) in the memory. By using later LSTM cell data (e.g., 316, 417, 517, 618) to update weighting values for prior LSTM cell data (e.g., 315, 416, 516, 617) in a sequence of turns of conversation input data, the method includes displaying the conversation participants' turns on the graphical user interface (217) with a visible indication of respective weighting values for each of the participants' turns.

The methods and computer implemented algorithms for processing conversation data according to this disclosure may be implemented as a system via the above described computer equipment, such as a processor (202), memory (204), and graphical user interface (217). The memory may have software stored thereon, or accessible via a network to implement the computerized methods and computer implemented algorithms of this disclosure. Any single memory device may be considered a computer program product carrying the software and instructions to implement the described methods.

Figure 7:
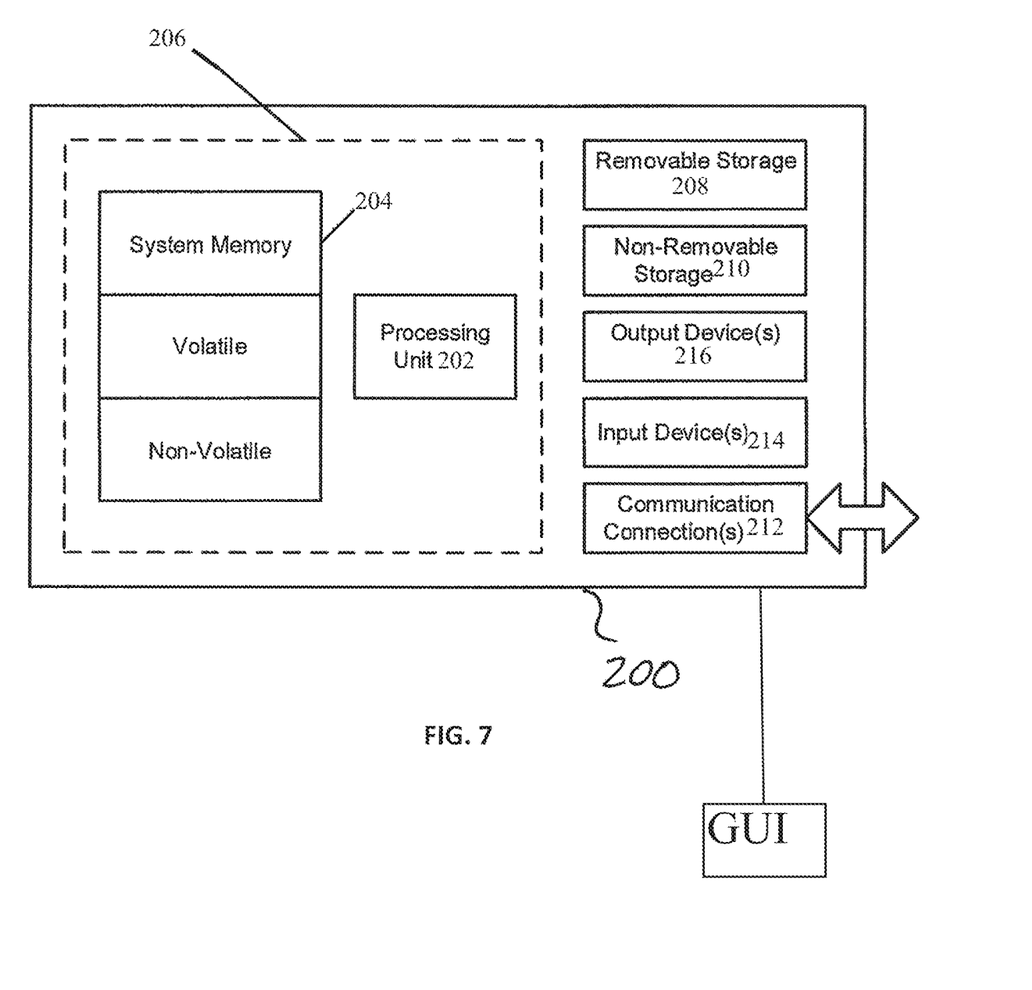
FIG. 7 is a representation of a computer environment in which the method of this disclosure may be practiced.

With reference to FIG. 7, an exemplary system for implementing aspects described herein includes a computing device, such as computing device 200. In its most basic configuration, computing device 200 typically includes at least one processing unit 202 and memory 204. Depending on the exact configuration and type of computing device, memory 204 may be volatile (such as random access memory (RAM)), non-volatile (such as read-only memory (ROM), flash memory, etc.), or some combination of the two. This most basic configuration is illustrated in FIG. 7 by dashed line 206.

Computing device 200 may have additional features/functionality. For example, computing device 200 may include additional storage (removable and/or non-removable) including, but not limited to, magnetic or optical disks or tape. Such additional storage is illustrated in FIG. 7 by removable storage 208 and non-removable storage 210.

Computing device 200 typically includes a variety of computer readable media. Computer readable media can be any available media that can be accessed by the device 200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 204, removable storage 208, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of computing device 200.

Computing device 200 may contain communication connection(s) 612 that allow the device to communicate with other devices. Computing device 200 may also have input device(s) 614 such as a keyboard, mouse, pen, voice input device, touch input device, etc. Output device(s) 616 such as a display (217), speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

REFERENCES

Leila Arras, Franziska Horn, Gregoire Montavon, Klaus-Robert Muller, and Wojciech Samek. 2017a. "what is relevant in a text document?": An interpretable machine learning approach. PloS one 12(8):e0181142.

Leila Arras, Gregoire Montavon, Klaus-Robert Muller, and Wojciech Samek. 2017b. Explaining recurrent neural network predictions in sentiment analysis. In Proceedings of the 8th Workshop on Computational Approaches to Subjectivity, Sentiment and Social Media Analysis. ACL, pages 159-168.

Sebastian Bach, Alexander Binder, Gregoire Montavon, Frederick Klauschen, Klaus-Robert Muller, and Wojciech Samek. 2015. On pixel-wise explanations for non-linear classifier decisions by layer-wise relevance propagation. PloS one 10(7):e0130140.

Dzmitry Bahdanau, Kyunghyun Cho, and Yoshua Bengio. 2014. Neural machine translation by jointly learning to align and translate. arXiv preprint arXiv: 1409.0473.

Peter F Brown, Vincent J Della Pietra, Robert L Mercer, Stephen A Della Pietra, and Jennifer C Lai. 1992. An estimate of an upper bound for the entropy of english. Computational Linguistics 18(1):31-40.

Cynthia Freeman and Ian Beaver. 2017. Online proactive escalation in multi-modal automated assistants. In FLAIRS 2017. AAAI Press.

Gregoire Montavon, Wojciech Samek, and Klaus Robert Muller. 2017. Methods for interpreting and understanding deep neural networks. Digital Signal Processing. Next-IT. 2018. Next it case studies, http://nextit.com/case-studies.

Marco Tulio Ribeiro, Sameer Singh, and Carlos Guestrin. 2016. Why should i trust you?: Explaining the predictions of any classifier. In Proceedings of the 22nd ACM SIGKDD International Conference on Knowledge Discovery and Data Mining. ACM, pages 1135-1144.

Avanti Shrikumar, Peyton Greenside, Anna Shcherbina, and Anshul Kundaje. 2016. Not just a black box: Learning important features through propagating activation differences. arXiv preprint arXiv:1605.01713.

Zichao Yang, Diyi Yang, Chris Dyer, Xiaodong He, Alexander J Smola, and Eduard H Hovy. 2016. Hierarchical attention networks for document classification. In HLT-NAACL. pages 1480-1489.

Martin Abadi, Ashish Agarwal, Paul Barham, Eugene Brevdo, Zhifeng Chen, Craig Citro, Greg S. Corrado, Andy Davis, Jeffrey Dean, Matthieu Devin, Sanjay Ghemawat, Ian Goodfellow, Andrew Harp, Geoffrey Irving, Michael Isard, Yangqing Jia, Rafal Jozefowicz, Lukasz Kaiser, Manjunath Kudlur, Josh Levenberg, Dandelion Mane, Rajat Monga, Sherry Moore, Derek Murray, Chris Olah, Mike Schuster, Jonathon Shlens, Benoit Steiner, Ilya Sutskever, Kunal Talwar, Paul Tucker, Vincent Vanhoucke, Vijay Vasudevan, Fernanda Viegas, Oriol Vinyals, Pete Warden, Martin Wattenberg, Martin Wicke, Yuan Yu, and Xiaoqiang Zheng. 2015. *Tensor-Flow: Large-scale machine learning on heterogeneous systems*. Software available from tensorflow.org. https://www.tensorflow.org/. Jeffrey Pennington, Richard Socher, and Christopher D. Manning. 2014. Glove: Global vectors for word representation. In Empirical Methods in Natural Language Processing (EMNLP). pages 1532-1543. http://www.aclweb.Org/anthology/D14-1162.

Zichao Yang, Diyi Yang, Chris Dyer, Xiaodong He, Alexander J Smola, and Eduard H Hovy. 2016. *Hierarchical attention networks for document classification*. In HLT-NAACL. pages 1480-1489.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the embodiments claimed herein.

The invention claimed is:

1. A computerized method for highlighting relative importance of portions of a conversation displayed on a graphical user interface, comprising:
   storing the conversation in text form in computerized memory connected to a computer processor that is configured to display conversation text on a graphical user interface, wherein a display of the conversation illustrates conversation data according to respective conversation participants' turns in providing conversation input;
   weighting respective turns of the conversation by providing the conversation input of the respective turns to a hierarchical attention network stored in the memory, wherein the hierarchical attention network uses the processor to calculate sequential long-short-term-memory cells (LSTM) in the memory;
   using later LSTM cell data to update weighting values for prior LSTM cell data in a sequence of turns of conversation input data; and
   displaying the conversation participants' turns on the graphical user interface with a visible indication of respective weighting values for each of the participants' turns;
   wherein weighting the respective turns comprises adding conversation input data from additional later turns of the conversation to new LSTM cells; and
   wherein weighting a group of turns in the conversation comprises forming a weight vector from occurrences of at least one attention dependency switch, at least one context dependency switch, and at least one variation dependency switch, averaging components of the vector, and representing each term in the group of terms on the graphical user interface with a pixel intensity that corresponds to the average of the components of the weight vector.

2. A computerized method according to claim 1, wherein weighting the respective turns comprises changing weights of the prior LSTM cell data in response to the additional later turns.

3. A computerized method according to claim 2, wherein the processor identifies a plurality of turns in the conversation illustrating at least one change in weight distribution among the plurality of turns as an attention dependency switch.

4. A computerized method according to claim 2, wherein the processor identifies sequential turns in the conversation illustrating at least one change in weight between two turns as a context dependency switch.

5. A computerized method according to claim 2, wherein the processor identifies at least one turn in the conversation illustrating at least one change in weight, across the entire conversation and greater than a variation dependency variable, as a variation dependency switch.

6. A computerized method according to claim 1, wherein the hierarchical attention network uses the processor to calculate sequential long-short-term-memory cells (LSTM) in the memory when a prior weighting of turns in a conversation have had a degree of uniformity greater than a uniformity tolerance threshold.

7. A computerized method according to claim 6, wherein the processor and memory form a turn weight vector comprising weighting values for turns in the conversation and calculate a degree of uniformity ($\alpha$) across members of the vector.

8. A computerized method according to claim 7, wherein the processor and the memory use the turn weight vector to identify either uniformity or non-uniformity across the weights in the weight vector by comparing sequential weighting vectors from sequential turns to an attention dependency variable ($\tau a$).

9. A computerized method according to claim 7, wherein the processor and the memory use the turn weight vector to identify instances across the conversation in which an addition of a turn changes the weights of previous turns by comparing the weighting vectors to a context dependency variable ($\tau c$).

10. A computerized method according to claim 7, wherein the processor and the memory use the turn weight vector to identify individual weighting value changes across the conversation in which an addition of a turn changes the weight of a respective individual weighting value more than variation dependency variable ($\tau v$).

11. A computerized method according to claim 1, wherein a selection of the visible indication of respective weighting values for each of the participants' turns is updated in real time during the conversation.

12. A computerized method according to claim 1, wherein a point of escalation in the conversation is identified from the weighting values.

13. A computerized system comprising the method of claim 1 implemented in system hardware comprising the processor, memory, and graphical user interface.

14. A computerized method for highlighting relative importance of portions of a conversation displayed on a graphical user interface, comprising:
   storing the conversation in text form in computerized memory connected to a computer processor that is configured to display conversation text on a graphical user interface, wherein a display of the conversation illustrates conversation data according to respective conversation participants' turns in providing conversation input;
   weighting respective turns of the conversation by providing the conversation input of the respective turns to a hierarchical attention network stored in the memory, wherein the hierarchical attention network uses the processor to calculate sequential long-short-term-memory cells (LSTM) in the memory;
   using later LSTM cell data to update weighting values for prior LSTM cell data in a sequence of turns of conversation input data; and displaying the conversation participants' turns on the graphical user interface with a visible indication of respective weighting values for each of the participants' turns;

wherein displaying the conversation participants' turns on the graphical user interface with a visible indication of respective weighting values comprises:

the processor and memory forming a turn weight vector comprising weighting values for turns in the conversation and calculating a degree of uniformity ($\alpha$) across members of the vector;

the processor and the memory using the turn weight vector to identify attention dependency and either uniformity or non-uniformity across the weighting values in the weight vector by comparing sequential weighting vectors from sequential turns to an attention dependency variable ($\tau a$);

the processor and the memory using the turn weight vector to identify instances across the conversation in which an addition of a turn identifies context dependency and changes in the weighting values of previous turns by comparing the weighting vectors to a context dependency variable ($\tau c$);

the processor and the memory use the turn weight vector to identify variation dependency and individual weighting value changes across the conversation, in which an addition of a turn changes the weight of a respective individual weighting value more than variation dependency variable ($\tau v$); and selecting the visible indication for displaying the respective turns according to combinations of attention dependency, context dependency, and variation dependency across the turn weight vector for the conversation.

* * * * *